United States Patent
Yasui

(10) Patent No.: US 12,266,087 B2
(45) Date of Patent: Apr. 1, 2025

(54) CONTROL DEVICE AND CONTROL METHOD FOR MOBILE OBJECT, STORAGE MEDIUM, AND VEHICLE

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 449 days.

(21) Appl. No.: 17/677,272

(22) Filed: Feb. 22, 2022

(65) Prior Publication Data

US 2022/0309624 A1    Sep. 29, 2022

(30) Foreign Application Priority Data

Mar. 23, 2021  (JP) .................. 2021-049126

(51) Int. Cl.
*G06T 5/80*       (2024.01)
*B60R 11/04*      (2006.01)
(Continued)

(52) U.S. Cl.
CPC ............ *G06T 5/80* (2024.01); *B60R 11/04* (2013.01); *G06T 3/047* (2024.01); *B60R 2011/004* (2013.01)

(58) Field of Classification Search
CPC . G06T 5/80; G06T 3/047; G06T 2207/30252; B60R 11/04; B60R 2011/004; B60R 1/00; B60R 2300/105; B60R 2300/30; B60R 2300/301; B60R 2300/302; B60R 2300/303; B60R 2300/80;
(Continued)

(56) References Cited

U.S. PATENT DOCUMENTS

2019/0066276 A1*    2/2019  Kawana ............... G06T 5/80

FOREIGN PATENT DOCUMENTS

EP          3160138 B1 *  3/2021
JP       2018-171964 A    11/2018

OTHER PUBLICATIONS

Han, Enhanced Road Boundary and Obstacle Detection Using a Downward-Looking LIDAR Sensor, IEEE Transactions on Vehicular Technology, vol. 61, No. 3, Mar. 2012 (Year: 2012).*

* cited by examiner

*Primary Examiner* — Vu Le
*Assistant Examiner* — Lei Zhao
(74) *Attorney, Agent, or Firm* — Thomas | Horstemeyer, LLP

(57) ABSTRACT

A control device for a mobile object includes an image acquisition unit configured to acquire an image of an external environment from imaging devices, a correction unit configured to perform distortion reduction processing for reducing distortion of an image for each of one or more regions included in images acquired from the imaging devices, and a recognition unit configured to recognize the external environment of the mobile object based on an image on which the distortion reduction processing has been performed. When a first region that is an imaging region in a specific direction with respect to the mobile object in an image acquired from a first imaging device is set as a target of the distortion reduction processing, a second region that is an imaging region in the specific direction in an image acquired from a second imaging device is set as a target of the distortion reduction processing.

13 Claims, 13 Drawing Sheets

(51) Int. Cl.
*G06T 3/047* (2024.01)
*B60R 11/00* (2006.01)
(58) Field of Classification Search
CPC ............... B60W 30/08; B60W 60/001; B60W 2420/403; B60W 2420/408
See application file for complete search history.

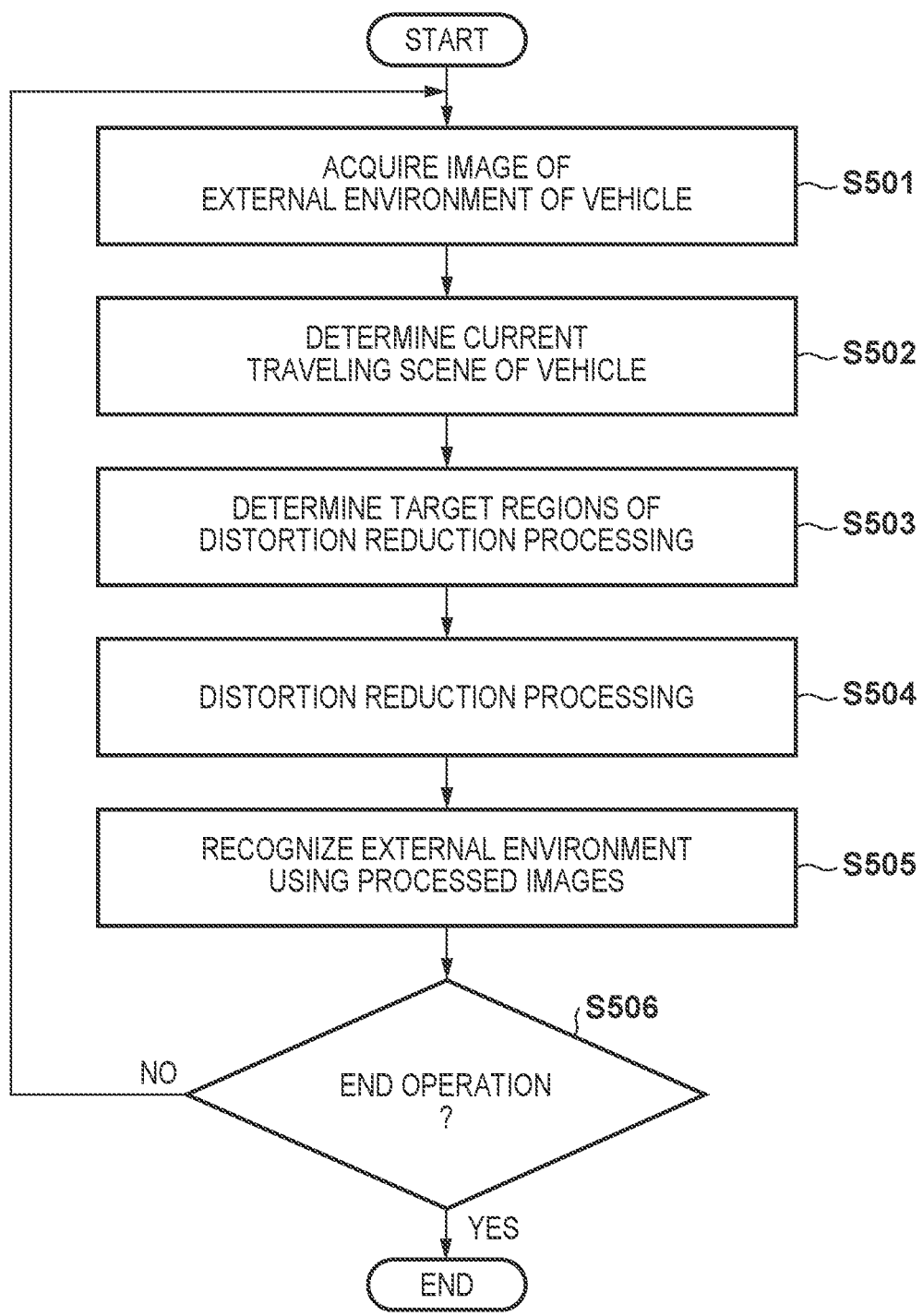

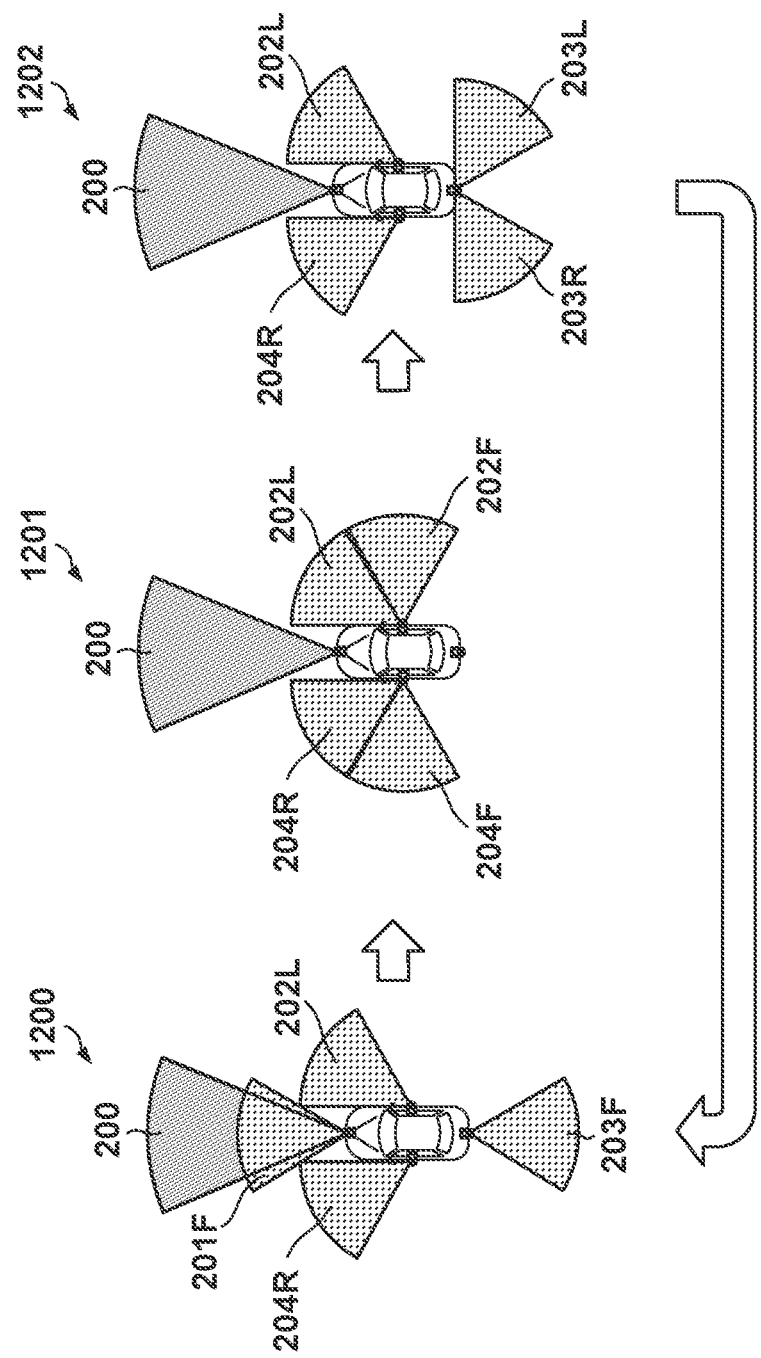

CONTROL DEVICE AND CONTROL METHOD FOR MOBILE OBJECT, STORAGE MEDIUM, AND VEHICLE

CROSS-REFERENCE TO RELATED APPLICATION(S)

This application claims priority to and the benefit of Japanese Patent Application No. 2021-049126 filed on Mar. 23, 2021, the entire disclosure of which is incorporated herein by reference.

BACKGROUND OF THE INVENTION

Field of the Invention

The present disclosure relates to a control device and a control method for a mobile object, a storage medium, and a vehicle.

Description of the Related Art

A technique for recognizing an external environment of a vehicle using a plurality of cameras has been put into practical use. Recognition results of the external environment are used for driving assistance and automated driving. Japanese Patent Laid-Open No. 2018-171964 proposes a technique for capturing an image of surroundings of a vehicle in a wide range by a wide-angle lens camera. Coordinate transformation is performed on an image captured by a wide-angle lens camera in order to reduce distortion.

SUMMARY OF THE INVENTION

Processing for reducing distortion of an image captured by a camera to which a wide-angle lens or a fisheye lens is attached consumes power. Thus, if the processing of reducing the distortion is excessively executed in order to recognize the external environment of the vehicle, the power consumption increases. Such an increase in power consumption is not limited to the vehicle, and is also applicable to other mobile objects. Some aspects of the present disclosure provide a technology for appropriately recognizing an external environment of a mobile object.

According to an embodiment, a control device for a mobile object including a plurality of imaging devices including a first imaging device and a second imaging device, includes an image acquisition unit configured to acquire an image of an external environment of the mobile object from the plurality of imaging devices, a correction unit configured to perform distortion reduction processing for reducing distortion of an image for each of one or more regions included in images acquired from the plurality of imaging devices, and a recognition unit configured to recognize the external environment of the mobile object based on an image on which the distortion reduction processing has been performed. The correction unit is configured to, when a first region that is an imaging region in a specific direction with respect to the mobile object in an image acquired from the first imaging device is set as a target of the distortion reduction processing, set a second region that is an imaging region in the specific direction in an image acquired from the second imaging device as a target of the distortion reduction processing.

BRIEF DESCRIPTION OF THE DRAWINGS

FIG. 5 is a flowchart illustrating an operation example of a control device for the vehicle according to the embodiment;

FIG. 12 is a schematic diagram illustrating state transition in accordance with a specific rule according to the embodiment.

DESCRIPTION OF THE EMBODIMENTS

Figure 1:
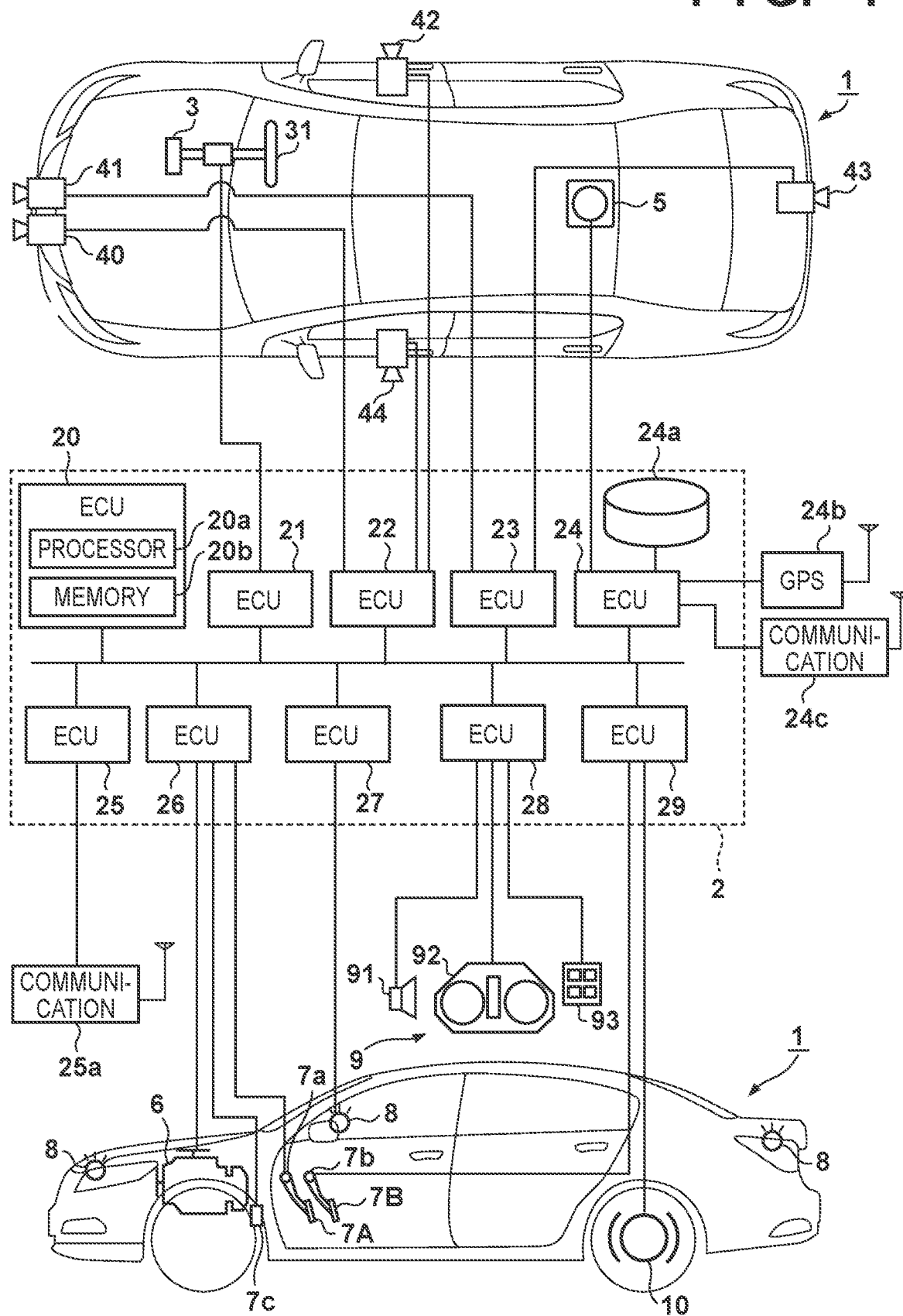
FIG. 1 is a block diagram illustrating a configuration example of a vehicle according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Note that in the following embodiment, description will be made assuming that a mobile object is a vehicle, but the mobile object is not limited to a vehicle, and may be a flying object, a robot, or the like.

FIG. 1 is a block diagram of a vehicle 1 according to an embodiment of the present invention. In FIG. 1, an outline of a vehicle 1 is illustrated in a plan view and a side view. The vehicle 1 is, for example, a four-wheeled passenger vehicle of a sedan type. The vehicle 1 may be such a four-wheeled vehicle, a two-wheeled vehicle, or another type of vehicle.

The vehicle 1 includes a vehicle control device 2 (hereinafter, simply referred to as a control device 2) that controls the vehicle 1. The control device 2 includes a plurality of electronic control units (ECUs) 20 to 29 communicably connected by an in-vehicle network. Each ECU includes a processor such as a central processing unit (CPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20a and a memory 20b. Processing by the ECU 20 is executed by the processor 20a executing a command including the program stored in the memory 20b. Alternatively, the ECU 20 may include a dedicated integrated circuit such as an application specific integrated circuit (ASIC) for executing processing by the ECU 20. A similar configuration applies to other ECUs.

Hereinafter, functions and the like assigned to each of the ECUs 20 to 29 will be described. Note that the number of ECUs and the functions assigned to the ECUs can be designed as appropriate and can be subdivided or integrated as compared with the present embodiment.

The ECU 20 executes control related to automated traveling of the vehicle 1. In automated driving, at least one of the steering and acceleration/deceleration of the vehicle 1 is automatically controlled. The automated traveling by the ECU 20 may include automated traveling that does not require a traveling operation by a driver (which may also be referred to as automated driving) and automated traveling for assisting the traveling operation by the driver (which may also be referred to as driving assistance).

The ECU 21 controls an electric power steering device 3. The electric power steering device 3 includes a mechanism that steers a front wheel according to a driver's driving operation (steering operation) on a steering wheel 31. In addition, the electric power steering device 3 includes a motor that exerts a driving force for assisting the steering operation and automatically steering the front wheel, a sensor that detects a steering angle, and the like. In a case where the driving state of the vehicle 1 is automated driving, the ECU 21 controls the electric power steering device 3 in an automated manner in response to an instruction from the ECU 20, and controls the traveling direction of the vehicle 1.

The ECUs 22 and 23 perform control of a detection unit that detects a situation around the vehicle and information processing of a detection result. The vehicle 1 includes one standard camera 40 and four fisheye cameras 41 to 44 as the detection unit that detects a situation of the vehicle. The standard camera 40 and the fisheye cameras 42 and 44 are connected to the ECU 22. The fisheye cameras 41 and 43 are connected to the ECU 23. The ECUs 22 and 23 can extract the contour of a target object and a vehicle lane line (such as a white line) on the road by analyzing images captured by the standard camera 40 and the fisheye cameras 41 to 44.

The fisheye cameras 41 to 44 are cameras to which a fisheye lens is attached. Hereinafter, a configuration of the fisheye camera 41 will be described. Other fisheye cameras 42 to 44 may have similar configurations. An angle of view of the fisheye camera 41 is wider than an angle of view of the standard camera 40. Thus, the fisheye camera 41 can capture a wider range than the standard camera 40. The image captured by the fisheye camera 41 has a large distortion compared to the image captured by the standard camera 40. Thus, before analyzing the image captured by the fisheye camera 41, the ECU 23 may perform conversion processing (hereinafter, referred to as "distortion reduction processing") for reducing distortion on the image. On the other hand, the ECU 22 does not need to perform the distortion reduction processing on the image captured by the standard camera 40 before analyzing the image. Thus, the standard camera 40 is an imaging device for capturing an image not to be a target of the distortion reduction processing, and the fisheye camera 41 is an imaging device for capturing an image to be a target of the distortion reduction processing. Instead of the standard camera 40, another imaging device that captures an image not to be a target of the distortion reduction processing, for example, a camera to which a wide-angle lens or a telephoto lens is attached, may be used.

The standard camera 40 is attached at the center of a front portion of the vehicle 1 and captures an image of a situation ahead of the vehicle 1. The fisheye camera 41 is attached at the center of the front portion of the vehicle 1 and captures an image of a situation ahead of the vehicle 1. In FIG. 1, the standard camera 40 and the fisheye camera 41 are illustrated as being arranged in a horizontal direction. However, the arrangement of the standard camera 40 and the fisheye camera 41 is not limited thereto, and may be, for example, arranged in a vertical direction. In addition, at least one of the standard camera 40 and the fisheye camera 41 may be attached to a front portion of the roof (for example, on the vehicle interior side of the windshield) of the vehicle 1. For example, the fisheye camera 41 may be attached at the center of the front portion (for example, a bumper) of the vehicle 1, and the standard camera 40 may be attached at the front portion of the roof of the vehicle 1. The fisheye camera 42 is attached at the center of a right side portion of the vehicle 1 and captures an image of a situation on the right of the vehicle 1. The fisheye camera 43 is attached at the center of a rear portion of the vehicle 1 and captures an image of a situation behind the vehicle 1. The fisheye camera 44 is attached at the center of a left side portion of the vehicle 1 and captures an image of a situation on the left of the vehicle 1.

The type, number, and attachment position of the camera included in the vehicle 1 are not limited to the above-described examples. In addition, the vehicle 1 may include a light detection and ranging (LIDAR) or a millimeter wave radar as a detection unit for detecting a target object around the vehicle 1 and measuring the distance to the target object.

The ECU 22 controls the standard camera 40 and the fisheye cameras 42 and 44 and performs information processing on detection results. The ECU 23 controls the fisheye cameras 41 and 43 and performs information processing on detection results. The reliability of the detection results can be improved by dividing the detection units for detecting the situation of the vehicle into two systems.

The ECU 24 controls a gyro sensor 5, a global positioning system (GPS) sensor 24b, and a communication device 24c, and performs information processing on detection results or communication results. The gyro sensor 5 detects a rotational motion of the vehicle 1. The detection result of the gyro sensor 5, the wheel speed, and the like enable determination of the course of the vehicle 1. The GPS sensor 24b detects the current location of the vehicle 1. The communication device 24c performs wireless communication with a server that provides map information and traffic information and acquires these pieces of information. The ECU 24 can access a database 24a on map information constructed in the memory, and the ECU 24 searches for a route from the current position to a destination and the like. The ECU 24, the map database 24a, and the GPS sensor 24b constitute a so-called navigation device.

The ECU 25 is provided with a communication device 25a for inter-vehicle communication. The communication device 25a performs wireless communication with other surrounding vehicles to exchange information between the vehicles.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine according to the driving operation (accelerator operation or acceleration operation)

of the driver detected by an operation detection sensor 7a provided on an accelerator pedal 7A and switches the gear ratio of the transmission based on information such as the vehicle speed detected by a vehicle speed sensor 7c and the like. When the driving state of the vehicle 1 is automated driving, the ECU 26 automatically controls the power plant 6 in response to an instruction from the ECU 20 and controls the acceleration and deceleration of the vehicle 1.

The ECU 27 controls lighting devices (headlights, taillights, and the like) including direction indicators 8 (blinkers). In the example of FIG. 1, the direction indicators 8 are provided at a front portion, door mirrors, and a rear portion of the vehicle 1.

The ECU 28 controls an input/output device 9. The input/output device 9 outputs information to the driver and accepts an input of information from the driver. A voice output device 91 notifies the driver of information by voice. A display device 92 notifies the driver of information by displaying an image. The display device 92 is arranged on, for example, a front surface of a driver's seat, and constitutes an instrument panel or the like. Note that, although the sound and the display have been given as examples here, information may be notified by vibration or light. In addition, notification of information may be provided by using a combination of some of the sound, the display, the vibration, and the light. Further, the combination or the notification mode may vary in accordance with the level (for example, the degree of urgency) of information that should be notified. An input device 93 is arranged at a position where the driver is able to operate, and constitutes a switch group for giving an instruction to the vehicle 1, but may also include a voice input device.

The ECU 29 controls a brake device 10 and a parking brake (not illustrated). The brake device 10 is, for example, a disc brake device, is provided on each wheel of the vehicle 1, and applies resistance to the rotation of the wheel to decelerate or stop the vehicle 1. The ECU 29 controls working of the brake device 10 in response to the driver's driving operation (brake operation) that has been detected by an operation detection sensor 7b provided on a brake pedal 7B, for example. When the driving state of the vehicle 1 is automated driving, the ECU 29 automatically controls the brake device 10 in response to an instruction from the ECU 20 and controls the deceleration and stop of the vehicle 1. The brake device 10 and the parking brake are also capable of working to maintain a stopped state of the vehicle 1. In addition, when the transmission of the power plant 6 includes a parking lock mechanism, it can also be operated to maintain the stopped state of the vehicle 1.

Figure 2A:
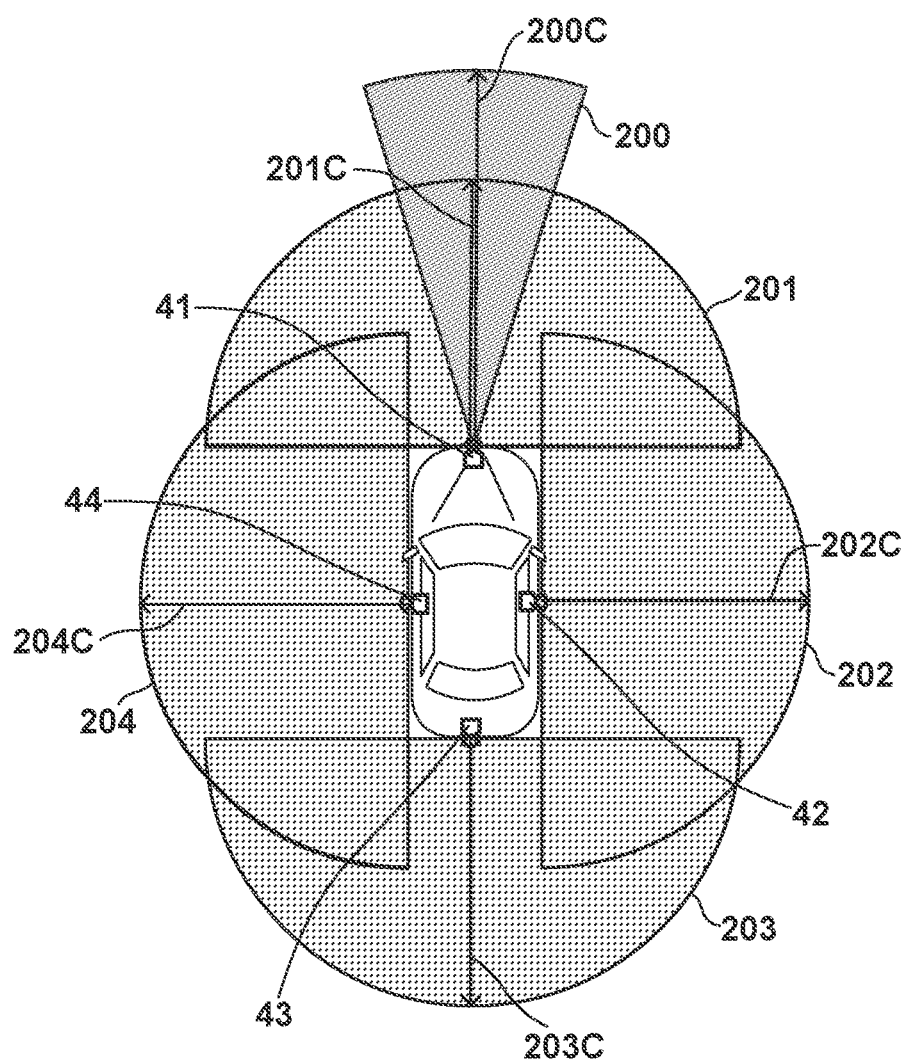
FIGS. 2A to 2D are schematic diagrams illustrating fields of view of cameras according to the embodiment.
Figure 2B:
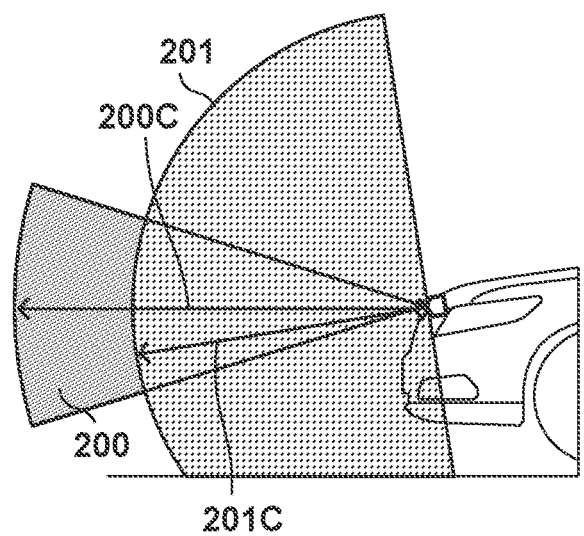
Figure 2C:
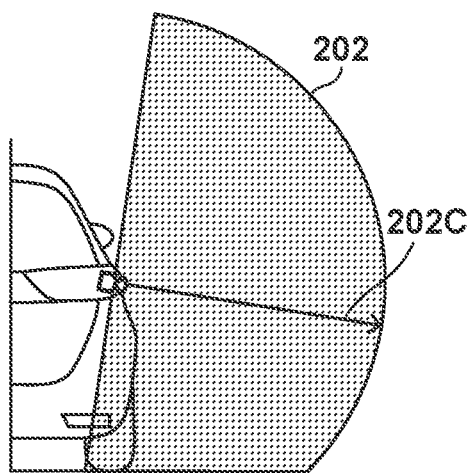
Figure 2D:
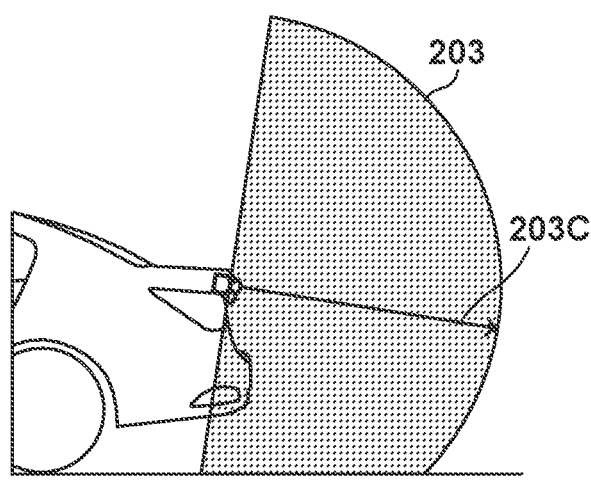

The fields of view of the standard camera 40 and the fisheye cameras 41 to 44 will be described with reference to FIGS. 2A to 2D. FIG. 2A illustrates fields of view in the horizontal direction of the respective cameras, FIG. 2B illustrates a field of view in the vertical direction of the fisheye camera 41 in the front portion of the vehicle 1, FIG. 2C illustrates a field of view in the vertical direction of the fisheye camera 42 in the right side portion of the vehicle 1, and FIG. 2D illustrates a field of view in the vertical direction of the fisheye camera 43 in the rear portion of the vehicle 1. In the present specification, the horizontal direction and the vertical direction are based on the vehicle body of the vehicle 1. The field of view in the vertical direction of the fisheye camera 42 on the left side portion of the vehicle 1 may be similar to that in FIG. 2C, and thus the description thereof is omitted.

First, fields of view of the vehicle 1 in a plan view (that is, the horizontal direction of the vehicle 1) will be described with reference to FIG. 2A. The standard camera 40 captures an image of a scene included in a field of view 200. An image-capture center 200C of the standard camera 40 faces a direction directly ahead of the vehicle 1. The image-capture center 200C may be defined by the direction of the optical axis of the lens. The angle of view in the horizontal direction of the standard camera 40 may be less than 90°, and may be, for example, about 45° or about 30°.

The fisheye camera 41 captures an image of a scene included in a field of view 201. The image-capture center 201C of the fisheye camera 41 faces the direction directly ahead of the vehicle 1. The fisheye camera 42 captures an image of a scene included in a field of view 202. The image-capture center 202C of the fisheye camera 42 faces a direction directly right of the vehicle 1. The fisheye camera 43 captures an image of a scene included in a field of view 203. The image-capture center 203C of the fisheye camera 43 faces a direction directly behind of the vehicle 1. The fisheye camera 44 captures an image of a scene included in a field of view 204. The image-capture center 204C of the fisheye camera 44 faces a direction directly left of the vehicle 1. The angles of view in the horizontal direction of the fisheye cameras 41 to 44 may be, for example, greater than 90°, greater than 150°, greater than 180°, or about 180°, for example. FIG. 2A illustrates an example in which the angle of view in the horizontal direction of the fisheye cameras 41 to 44 is 180°.

Next, fields of view in the vertical direction of view of the vehicle 1 will be described with reference to FIGS. 2B to 2D. FIG. 2B illustrates the field of view in the vertical direction of the fisheye camera 41, FIG. 2C illustrates the vertical field of view of the fisheye camera 42, and FIG. 2D illustrates the vertical field of view of the fisheye camera 43. The field of view in the vertical direction of the other fisheye camera 44 may be similar to that of FIG. 2C.

The angles of view in the vertical direction of the fisheye cameras 41 to 44 may be, for example, greater than 90°, greater than 150°, greater than 180°, or about 180°, for example. FIGS. 2B to 2D illustrate an example in which the angle of view in the vertical direction of the fisheye cameras 41 to 44 is 180°. The image-capture center 203C of the fisheye camera 43 is directed downward (toward the ground) with respect to a direction parallel to the ground. Alternatively, the image-capture center 203C of the fisheye camera 43 may be directed in a direction parallel to the ground, or may be directed upward (opposite to the ground) with respect to the direction parallel to the ground. In addition, the image-capture centers 201C to 204C of the fisheye cameras 41 to 44 may be directed in different directions in the vertical direction.

Since the standard camera 40 and the fisheye cameras 41 to 44 have the fields of view 200 to 204 as described above, each of the direction directly ahead of the vehicle 1 and four diagonal directions of the vehicle 1 is included in the fields of view of two separate cameras. Specifically, the direction directly ahead of the vehicle 1 is included in both the field of view 200 of the standard camera 40 and the field of view 201 of the fisheye camera 41. The direction right-diagonally ahead of the vehicle 1 is included in both the field of view 201 of the fisheye camera 41 and the field of view 202 of the fisheye camera 42. The same applies to the other three diagonal directions of the vehicle 1.

Figure 3:
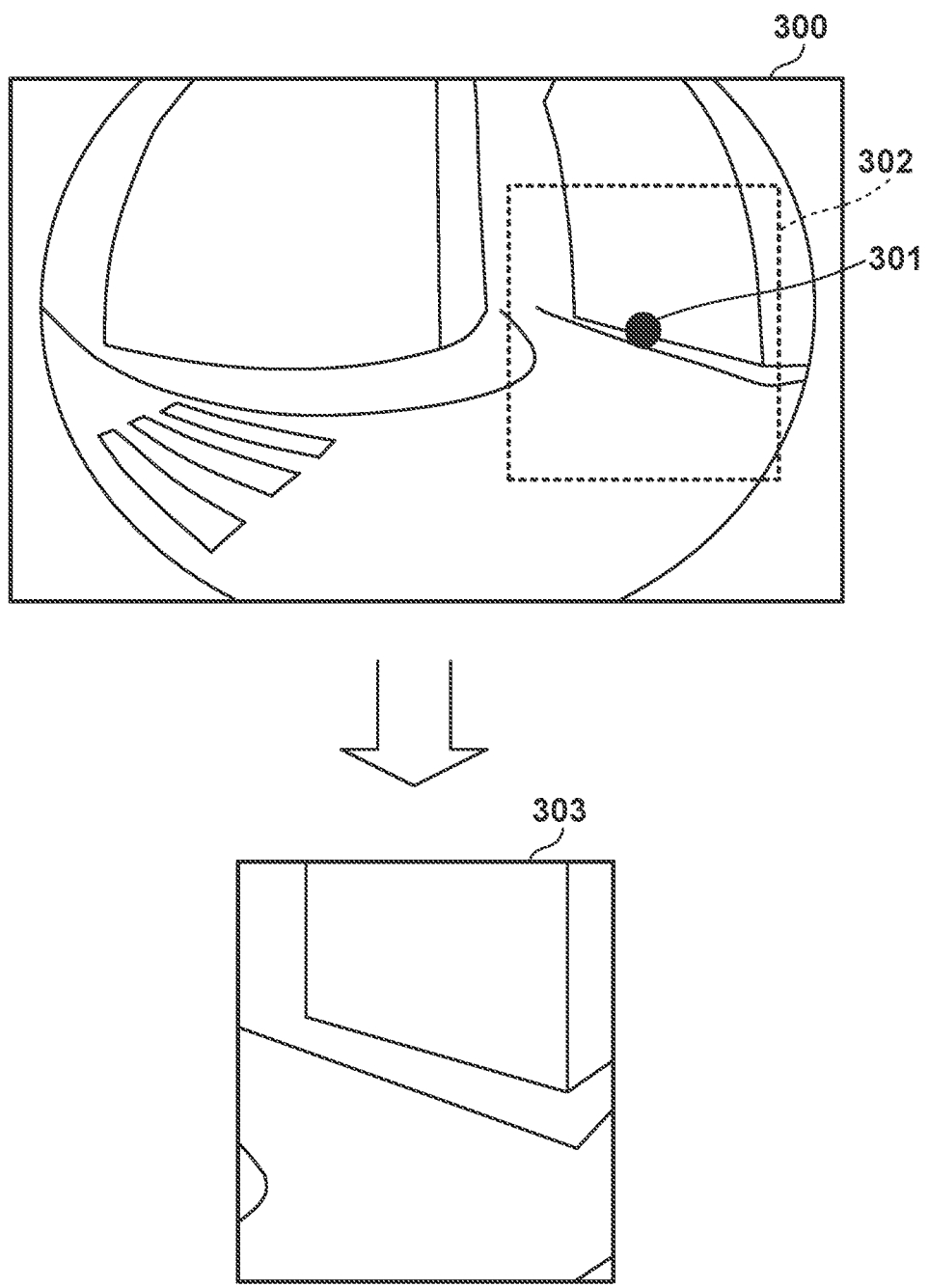
FIG. 3 is a schematic diagram illustrating distortion reduction processing according to the embodiment.
Figure 4A:
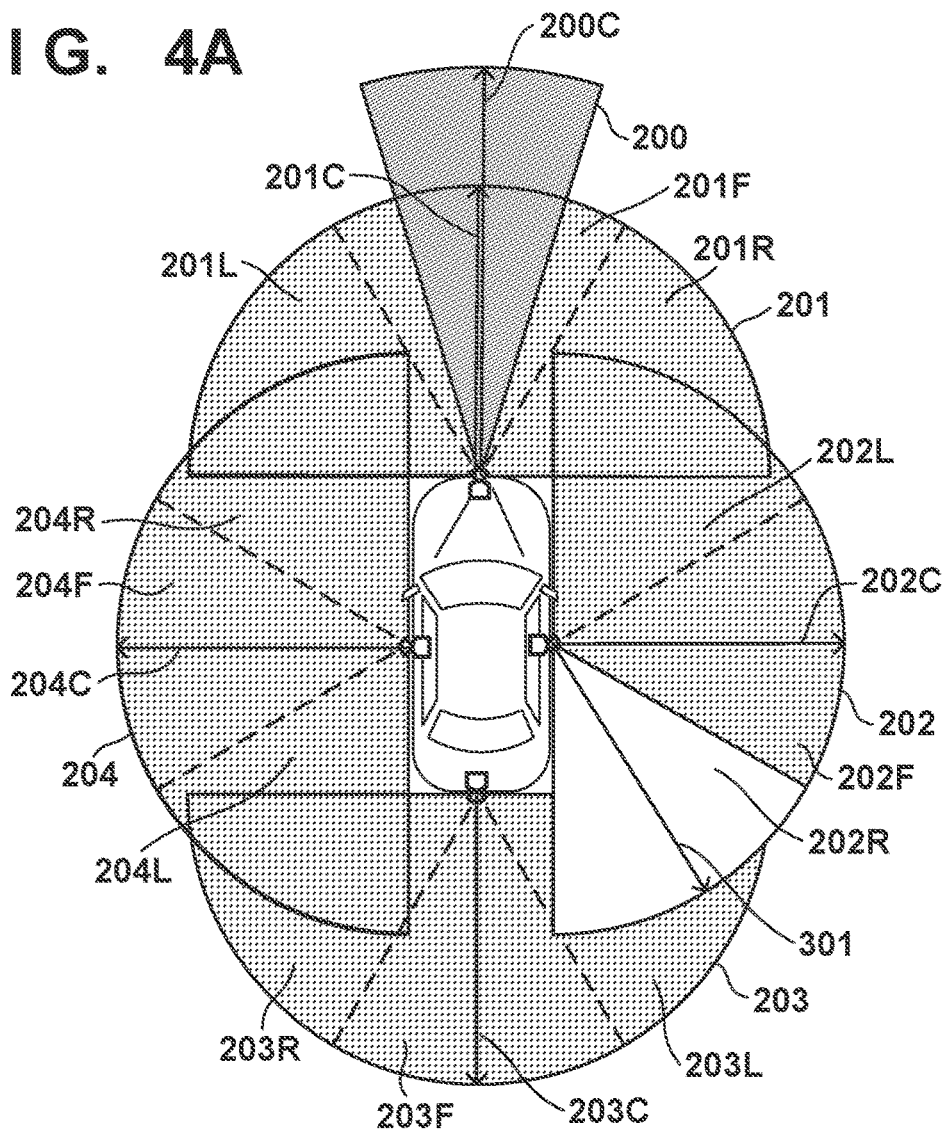
FIGS. 4A and 4B are schematic diagrams illustrating target regions of the distortion reduction processing according to the embodiment.
Figure 4B:
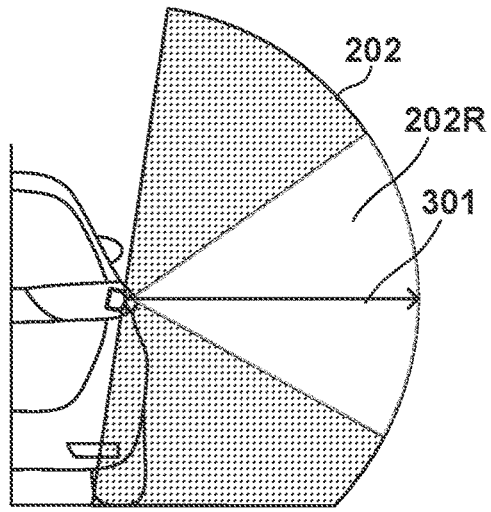

The distortion reduction processing of images captured by the fisheye cameras 41 to 44 will be described with reference to FIGS. 3 to 4B. FIG. 3 illustrates images before and after the distortion reduction processing. FIGS. 4A and 4B illustrate regions to be targets of the distortion reduction processing. FIG. 4A is a top view of vehicle 1, and FIG. 4B is a rear view of vehicle 1. An image 300 is an image of a situation on the right of the vehicle 1 captured by the fisheye camera 42. As illustrated in FIG. 3, the image 300 has a large distortion particularly in peripheral portions.

The ECU 22 connected to the fisheye camera 42 performs the distortion reduction processing on the image 300. Specifically, as illustrated in FIG. 3, the ECU 22 determines one point in the image 300 as a transform center 301. As illustrated in FIGS. 4A and 4B, the transform center 301 is located on the right side in the field of view 202 as viewed from the fisheye camera 42 in the horizontal direction, and is directed in a direction parallel to the ground in the vertical direction.

The ECU 22 cuts out a rectangular region 302 centered on the transform center 301 from the image 300. As illustrated in FIGS. 4A and 4B, the region 302 corresponds to a region 202R located on the right side as viewed from the fisheye camera 42 in the field of view 202. The ECU 22 generates the image 303 in which the distortion is reduced by performing the distortion reduction processing on the region 302. This image 303 is an image representing the situation of the region 202R.

As a result of the distortion reduction processing, the distortion is reduced at positions closer to the transform center 301, and the distortion is not reduced or is increased at positions farther from the transform center 301. In a case where the entire image 300 is a target of the distortion reduction processing, the distortion increases in a region located farther from the transform center 301. Thus, even if the external environment of the vehicle 1 is analyzed using this region located farther, accurate analysis cannot be performed. Accordingly, the control device 2 sets the transform center 301 in the analysis target region, performs distortion reduction processing on the region around the transform center 301, and analyzes the situation of the analysis target region using the processed image.

The field of view 201 includes, as analysis target regions, a region 201L for capturing in the direction left-diagonally ahead of the vehicle 1, a region 201F for capturing in the direction directly ahead of the vehicle 1, and a region 201R for capturing in the direction right-diagonally ahead of the vehicle 1. The field of view 202 includes, as analysis target regions, a region 202L for capturing in the direction right-diagonally ahead of the vehicle 1, a region 202F for capturing in the direction directly right of the vehicle 1, and a region 202R for capturing in the direction right-diagonally behind of the vehicle 1. The field of view 203 includes, as analysis target regions, a region 203L for capturing in the direction right-diagonally behind of the vehicle 1, a region 203F for capturing in the direction directly behind of the vehicle 1, and a region 203R for capturing in the direction left-diagonally behind of the vehicle 1. The field of view 204 includes, as analysis target regions, a region 204L for capturing in the direction left-diagonally behind of the vehicle 1, a region 204F for capturing in the direction directly left of the vehicle 1, and a region 204R for capturing in the direction left-diagonally ahead of the vehicle 1. The field of view 201 may be evenly (that is, such that the angles of view in the horizontal direction of the respective regions are equal) divided into the three regions 201L, 201F, and 201R in the horizontal direction. The other fields of view 202 to 204 may also be evenly divided into three.

In a case where it is desired to analyze the situation in the direction right-diagonally ahead of the vehicle 1, the control device 2 sets the transform center 301 in the region 202L (for example, the center of the region 202L) included in the field of view 202 of the fisheye camera 42, performs the distortion reduction processing on a region around the transform center 301, and analyzes the situation in the direction right-diagonally ahead of using the processed image. In a case where it is desired to analyze the situation in the direction directly right of the vehicle 1, the control device 2 sets the transform center 301 in the region 202F (for example, the center of the region 202F) included in the field of view 202 of the fisheye camera 42, performs the distortion reduction processing on a region around the transform center 301, and analyzes the situation in the direction directly right of the vehicle 1 using the processed image. In a case where it is desired to analyze the situation in the direction right-diagonally behind of the vehicle 1, the control device 2 sets the transform center 301 in the region 202R (for example, the center of the region 202R) included in the field of view 202 of the fisheye camera 42, performs the distortion reduction processing on a region around the transform center 301, and analyzes the situation in the direction right-diagonally behind of the vehicle 1 using the processed image.

An example of a method in which the control device 2 controls the vehicle 1 in some embodiments will be described with reference to FIG. 5. This method may be performed by the processor 20a of each of the ECUs 20 to 29 of the control device 2 executing a program in the memory 20b. The method of FIG. 5 may be started in response to turning on of a driving assistance function or an automated driving function by the control device 2.

In step S501, the control device 2 acquires an image of the external environment of the vehicle 1 from each of the standard camera 40 and the fisheye cameras 41 to 44. Each image includes the situation of the ranges described in FIGS. 2A to 2D in the external environment of the vehicle 1.

In step S502, the control device 2 determines the current traveling scene of the vehicle 1. In the example described below, a scene of traveling on a narrow road is handled as a traveling scene of the vehicle. Scenes other than this are handled as a normal (default) scene. The normal scene includes, for example, a scene where the vehicle 1 is traveling along a road.

In step S503, the control device 2 determines one or more regions to be targets of the distortion reduction processing in the image acquired in step S501 according to the rule corresponding to the current traveling scene of the vehicle 1. Hereinafter, this rule will be referred to as a region determination rule. The region determination rule is determined in advance and stored in, for example, the memory 20b. A specific example of the region determination rule will be described later.

In step S504, as illustrated in FIG. 3, the control device 2 performs the distortion reduction processing for each of one or more regions determined as targets of the distortion reduction processing. This distortion reduction processing is processing for reducing distortion of images acquired from the fisheye cameras 41 to 44. Since an existing technique may be used for the distortion reduction processing, detailed description thereof will be omitted. It is not necessary to perform the distortion reduction processing on an image acquired from the standard camera 40.

In step S505, the control device 2 recognizes the external environment of the vehicle 1 based on the image acquired from the standard camera 40 and the images acquired from the fisheye cameras 41 to 44 and subjected to the distortion reduction processing. For example, the control device 2 may specify the target object around the vehicle 1 by applying the corrected image to a model learned in advance and stored in the memory 20b. Further, the control device 2 may control (for example, automatic braking, notification to the driver, change of automated driving level, and the like) the vehicle 1 according to a recognition result of the external environment. Since an existing technique may be applied to control of the vehicle 1 according to the recognition result of the external environment, a detailed description thereof will be omitted.

In step S506, the control device 2 determines whether to end the operation. In a case where it is determined that the operation is to be ended ("YES" in step S506), the control device 2 ends the operation, and otherwise ("NO" in step S506), the control device 2 returns the operation to step S501. The control device 2 may determine to end the operation, for example, in response to turning off of the driving assistance function or the automated driving function.

As described above, steps S501 to S505 are repeatedly executed. The control device 2 may cyclically execute the operations of steps S501 to S505. This execution cycle varies depending on the time required for the distortion reduction processing in S504 and recognition processing in S505, and may be, for example, about 100 ms.

Figure 6:
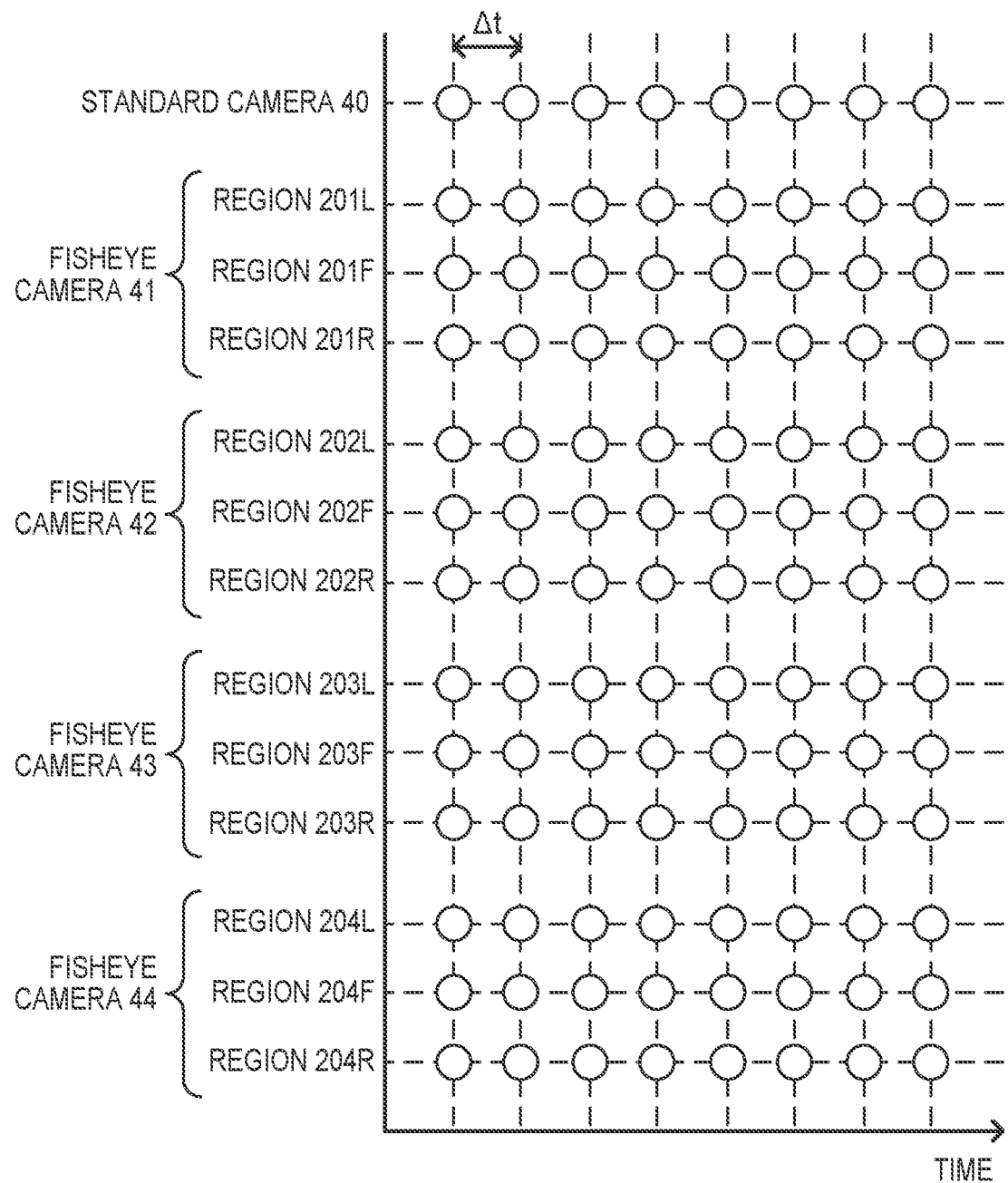
FIG. 6 is a timing chart illustrating target candidates for the distortion reduction processing according to the embodiment.

The cyclic operation of the control device 2 will be described with reference to FIG. 6. A circle in FIG. 6 indicates an image candidate to be used in the recognition processing in step S505. Δt in FIG. 6 indicates a cycle in which steps S501 to S505 are executed. The image acquired from the standard camera 40 has little distortion, and thus can be used in the recognition processing of step S505 without performing the distortion reduction processing of step S504. The image acquired from the fisheye cameras 41 to 44 is used in the recognition processing of step S505 after the distortion reduction processing is performed in step S504. As described above, the image acquired from the fisheye camera can generate an image in which the distortion reduction processing is performed on each of the three regions divided in the horizontal direction. Thus, at one operation timing of the cyclic operation, the control device 2 can execute the recognition processing using a maximum of 13 images. Twelve of the 13 images are acquired from the fisheye camera, and thus the distortion reduction processing is performed before the recognition processing. When the distortion reduction processing is performed on all of these 12 regions, the processing load increases and the power consumption also increases. Accordingly, in the following embodiment, it is determined which of the 12 regions is subjected to the distortion reduction processing at each operation timing and used for the recognition processing based on the traveling scene of the vehicle 1.

Figure 7:
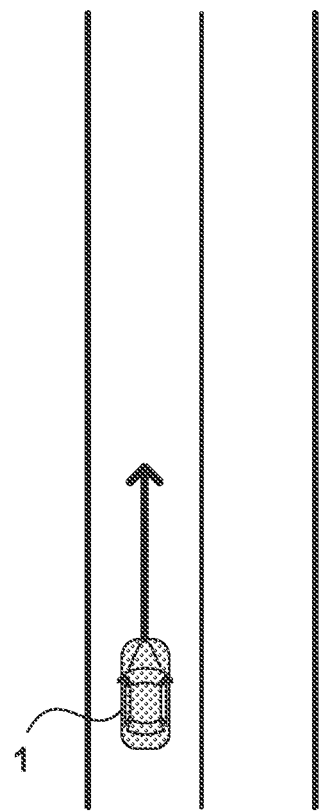
FIG. 7 is a schematic diagram illustrating a normal traveling scene according to the embodiment.

The region determination rule of the normal scene will be described with reference to FIGS. 7 to 9C. FIG. 7 illustrates an example of a traveling scene. In the example illustrated in FIG. 7, the vehicle 1 is traveling along a straight road.

Figure 8:
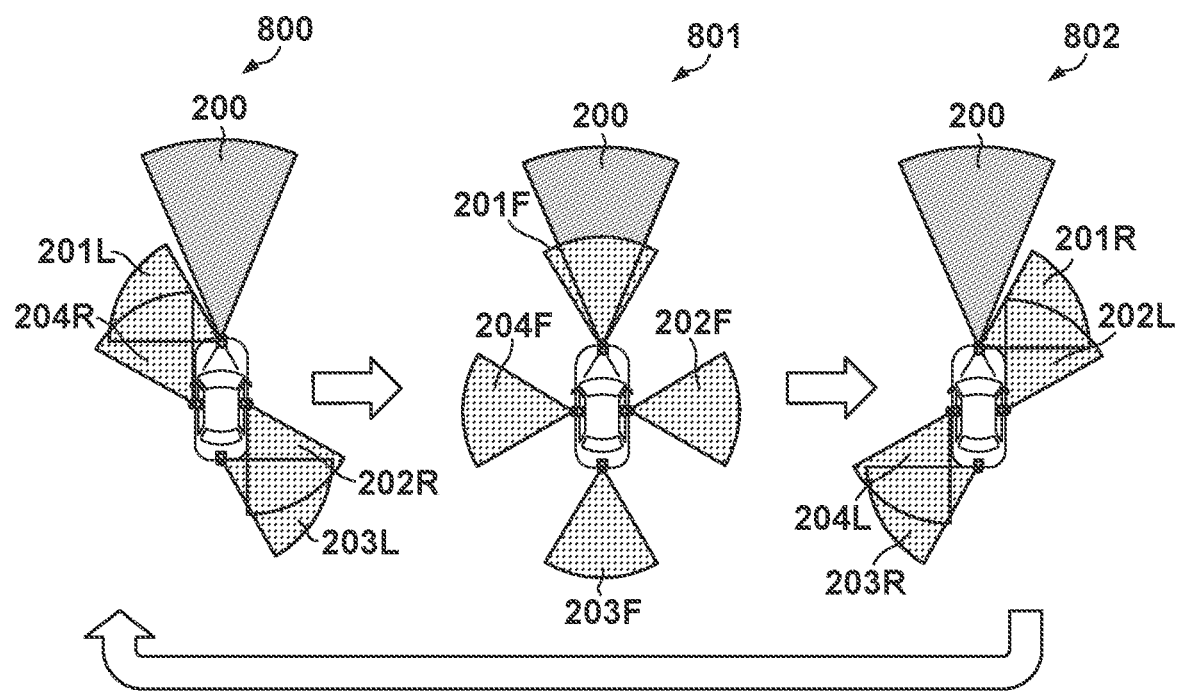
FIG. 8 is a schematic diagram illustrating a state transition in accordance with a specific rule according to the embodiment.

FIG. 8 illustrates regions to be analysis targets at respective operation timings. The control device 2 repeats states 800 to 802 in order. That is, assuming that the state is the state 800 at the operation timing of time t, the state becomes the state 801 at the operation timing of time t+Δt (as described above, Δt indicates a cycle), the state becomes the state 802 at the operation timing of time t+2×Δt, and the state returns to the state 800 at the operation timing of time t+3×Δt. The same applies to a region determination rule in other traveling scenes described later.

In the state 800, the field of view 200 by the standard camera 40, the region 201L by the fisheye camera 41, the region 202R by the fisheye camera 42, the region 203L by the fisheye camera 43, and the region 204R by the fisheye camera 44 are to be analysis targets. In the state 801, the field of view 200 by the standard camera 40, the region 201F by the fisheye camera 41, the region 202F by the fisheye camera 42, the region 203F by the fisheye camera 43, and the region 204F by the fisheye camera 44 are to be analysis targets. In the state 802, the field of view 200 by the standard camera 40, the region 201R by the fisheye camera 41, the region 202L by the fisheye camera 42, the region 203R by the fisheye camera 43, and the region 204L by the fisheye camera 44 are to be analysis targets.

In a case where a region included in the field of view of a fisheye camera is to be an analysis target, the control device 2 performs the distortion reduction processing on this region as described above. Therefore, the region determination rule defines the position in the horizontal direction of the region to be a target of the distortion reduction processing and the timing at which the region at this position is set as a target of the distortion reduction processing. In addition, the region determination rule individually defines a rule for each of the plurality of fisheye cameras 41 to 44.

By transitioning the state at every operation timing as described above, the control device 2 sets the direction directly ahead of the vehicle 1 as an analysis target every cycle (that is, every time), and sets each of the direction right-diagonally ahead of the vehicle 1, the direction directly right of the vehicle 1, the direction right-diagonally behind of the vehicle 1, the direction directly behind of the vehicle 1, the direction left-diagonally behind of the vehicle 1, the direction directly left of the vehicle 1, and the direction left-diagonally ahead of the vehicle 1 as an analysis target every three cycles. In addition, regions not to be analysis targets are distributed to a plurality of operation timings so that loads are not concentrated on the control device 2 at a specific operation timing. Further, analysis using both the image of the standard camera 40 and the image of a fisheye camera is performed every three cycles for the direction directly ahead of the vehicle 1, and analysis using both the images of two fisheye cameras is performed every three cycles for each of the four diagonal directions of the vehicle 1. In this manner, by setting a part of the images of the fisheye cameras 41 to 44 on which the distortion correction processing is performed as an analysis target at each operation timing, the processing load of the control device 2 is reduced, and the power consumption is reduced.

Figure 9A:
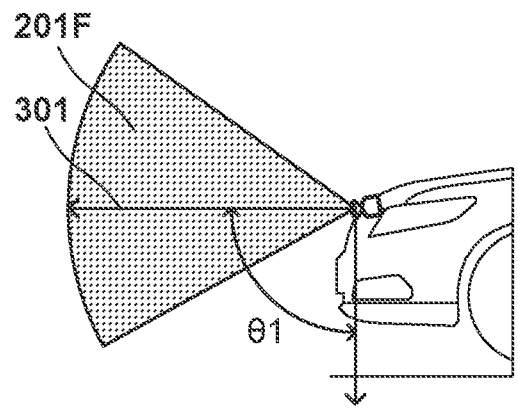
FIGS. 9A to 9C are schematic diagrams illustrating a position in a vertical direction of a region in accordance with a specific rule according to the embodiment.
Figure 9B:
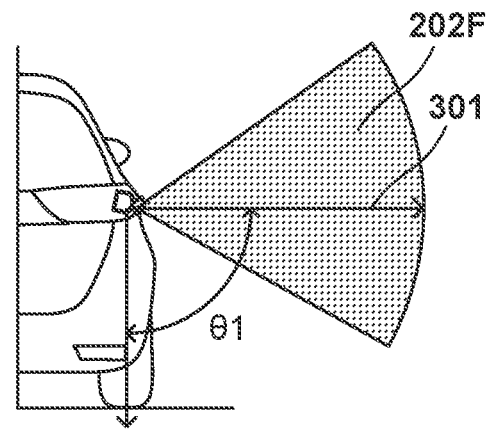
Figure 9C:
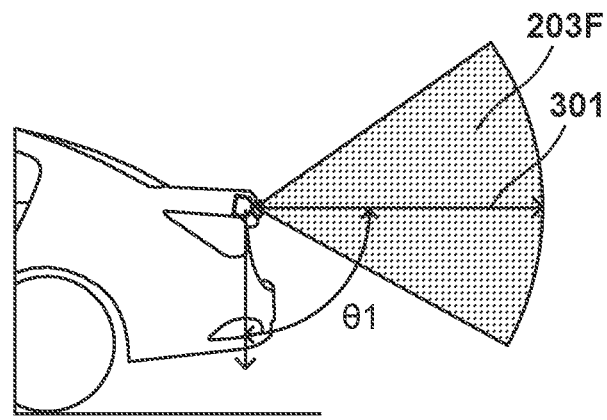

FIGS. 9A to 9C illustrate positions in the vertical direction of analysis target regions. FIG. 9A illustrates the position in the vertical direction of the region 201F by the fisheye camera 41. FIG. 9B illustrates the position in the vertical direction of the region 202F by the fisheye camera 42. FIG. 9C illustrates the position in the vertical direction of the region 203F by the fisheye camera 43. The position in the vertical direction of each region by the fisheye camera 44 may be similar to that in FIG. 9B, and thus the description thereof will be omitted.

In the region determination rule, as illustrated in FIG. 9A, an angle formed by the transform center 301 defining the region 201F and a vertically downward direction of the vehicle 1 is defined as $\theta 1$. $\theta 1$ may be 90 degrees or a value smaller than 90 degrees (for example, 80 degrees). Also in the regions 201R and 201L, the angle formed by the transform center 301 and the vertically downward direction of the vehicle 1 may be defined as $\theta 1$. Similarly, for the regions of the fisheye cameras 42 to 44, the angle formed by the transform center 301 and the vertically downward direction of the vehicle 1 may be defined as $\theta 1$. As described above, the region determination rule defines the position in the vertical direction of the region to be a target of the distortion reduction processing. By setting the angle formed by the transform center 301 and the vertically downward direction of the vehicle 1 to θ1 (for example, 90 degrees), a distant place and the vicinity of the vehicle 1 can be analyzed in a well-balanced manner.

Figure 10A:
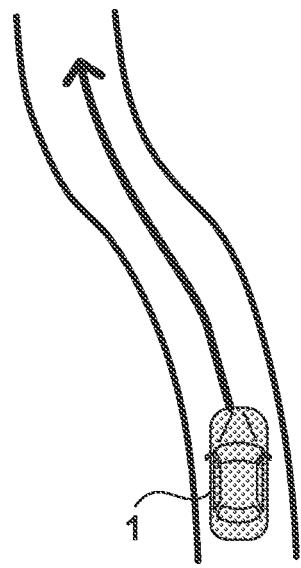
FIGS. 10A to 10D are schematic diagrams illustrating a specific traveling scene according to the embodiment.
Figure 10B:
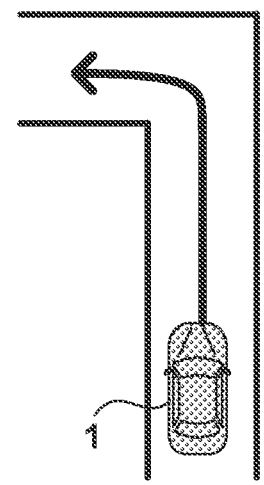
Figure 10C:
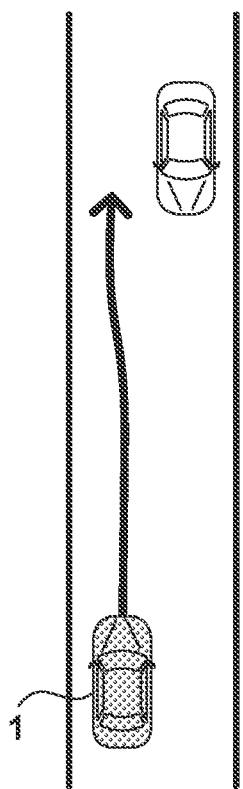
Figure 10D:
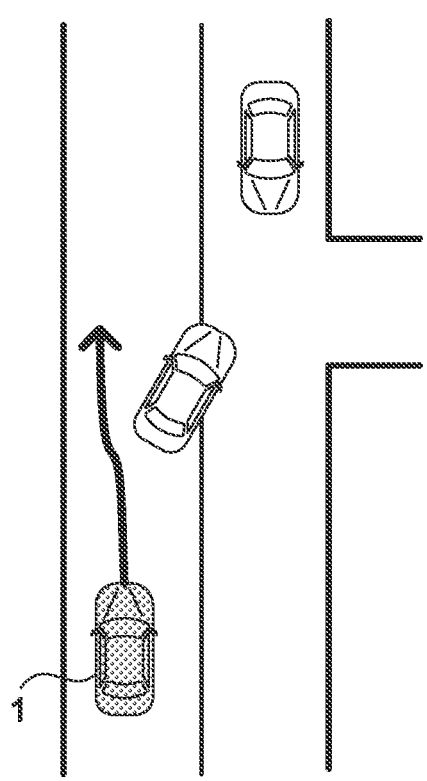

With reference to FIGS. 10A to 13C, the region determination rule of a scene where the vehicle 1 travels on a narrow road will be described. The narrow road may be a traveling scene where the distance between the vehicle 1 and the obstacle is equal to or less than a threshold (for example, 50 cm or less). FIGS. 10A to 10D illustrate an example of such a scene. FIG. 10A illustrates a scene where the vehicle 1 travels on an S-shaped curve. FIG. 10B illustrates a scene where the vehicle 1 travels on an L-shaped road. FIG. 10C illustrates a scene where the vehicle 1 passes an oncoming vehicle. The vehicle 10D illustrates a scene where the vehicle 1 passes by a preceding vehicle that is about to turn right and travels. As illustrated in FIGS. 10A and 10B, a narrow road may occur according to a road shape, and as illustrated in FIGS. 10C and 10D, a narrow road may occur according to a traffic situation.

Figure 11:
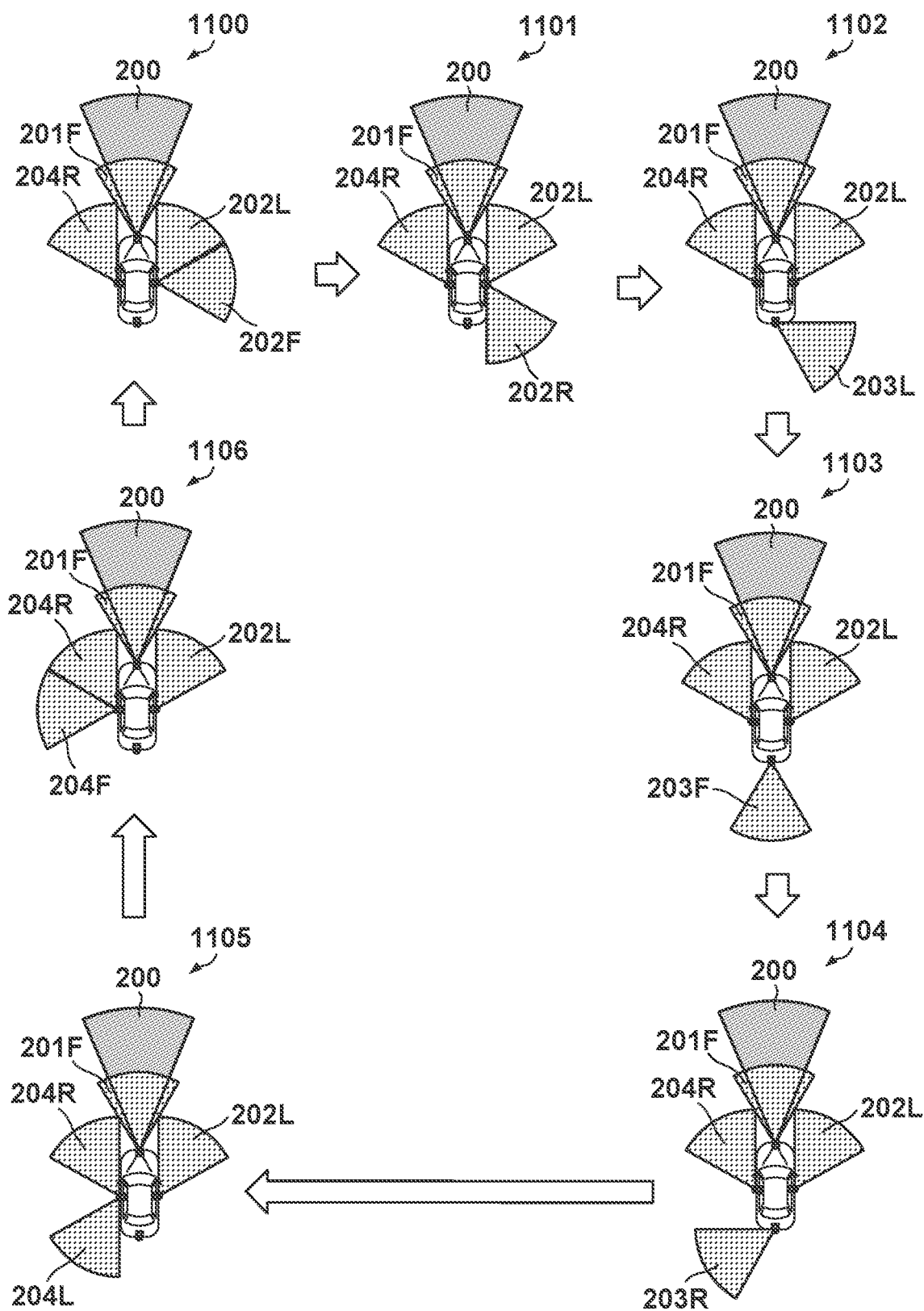
FIG. 11 is a schematic diagram illustrating state transition in accordance with a specific rule according to the embodiment.

FIG. 11 illustrates regions to be analysis targets at respective operation timings in an example of the region determination rule. The control device 2 repeats states 1100 to 1106 in order. In the state 1100, the field of view 200 by the standard camera 40, the region 201F by the fisheye camera 41, the regions 202L and 202F by the fisheye camera 42, and the region 204R by the fisheye camera 44 are to be analysis targets. In the state 1101, the field of view 200 by the standard camera 40, the region 201F by the fisheye camera 41, the regions 202L and 202R by the fisheye camera 42, and the region 204R by the fisheye camera 44 are to be analysis targets. In the state 1102, the field of view 200 by the standard camera 40, the region 201F by the fisheye camera 41, the region 202L by the fisheye camera 42, the region 203L by the fisheye camera 43, and the region 204R by the fisheye camera 44 are to be analysis targets. In the state 1103, the field of view 200 by the standard camera 40, the region 201F by the fisheye camera 41, the region 202L by the fisheye camera 42, the region 203F by the fisheye camera 43, and the region 204R by the fisheye camera 44 are to be analysis targets. In the state 1104, the field of view 200 by the standard camera 40, the region 201F by the fisheye camera 41, the region 202L by the fisheye camera 42, the region 203R by the fisheye camera 43, and the region 204R by the fisheye camera 44 are to be analysis targets. In the state 1105, the field of view 200 by the standard camera 40, the region 201F by the fisheye camera 41, the region 202L by the fisheye camera 42, and the regions 204R and 204L by the fisheye camera 44 are to be analysis targets. In the state 1106, the field of view 200 by the standard camera 40, the region 201F by the fisheye camera 41, the region 202L by the fisheye camera 42, and the regions 204R and 204F by the fisheye camera 44 are to be analysis targets.

By transitioning the state at every operation timing as described above, the control device 2 sets the direction directly ahead of the vehicle 1, the direction right-diagonally ahead of the vehicle 1, and the direction left-diagonally ahead of the vehicle 1 as analysis targets every cycle (that is, every time), sets each of the direction directly right of the vehicle 1, the direction directly behind of the vehicle 1, and the direction directly left of the vehicle 1 as an analysis target every seven cycles, and sets each of the direction right-diagonally behind of the vehicle 1 and the direction left-diagonally behind of the vehicle 1 as an analysis target twice among seven cycles. In addition, regions not to be analysis targets are distributed to a plurality of operation timings so that loads are not concentrated on the control device 2 at a specific operation timing.

FIG. 12 illustrates regions to be analysis targets at respective operation timings in an example of the region determination rule. The control device 2 repeats states 1200 to 1202 in order. In the state 1200, the field of view 200 by the standard camera 40, the region 201F by the fisheye camera 41, the region 202L by the fisheye camera 42, the region 203F by the fisheye camera 43, and the region 204R by the fisheye camera 44 are to be analysis targets. In the state 1201, the field of view 200 by the standard camera 40, the regions 202L and 202F by the fisheye camera 42, and the regions 204F and 204R by the fisheye camera 44 are set as analysis targets. In the state 1202, the field of view 200 by the standard camera 40, the region 202L by the fisheye camera 42, the regions 203L and 203R by the fisheye camera 43, and the region 204R by the fisheye camera 44 are set as analysis targets.

By transitioning the state at every operation timing as described above, the control device 2 sets the direction directly ahead of the vehicle 1, the direction right-diagonally ahead of the vehicle 1, and the direction left-diagonally ahead of the vehicle 1 as analysis targets every cycle (that is, every time), and sets each of the direction directly right of the vehicle 1, the direction right-diagonally behind of the vehicle 1, the direction directly behind of the vehicle 1, the direction left-diagonally behind of the vehicle 1, and the direction directly left of the vehicle 1 as an analysis target every three cycles. In addition, regions not to be analysis targets are distributed to a plurality of operation timings so that loads are not concentrated on the control device 2 at a specific operation timing.

Figure 13A:
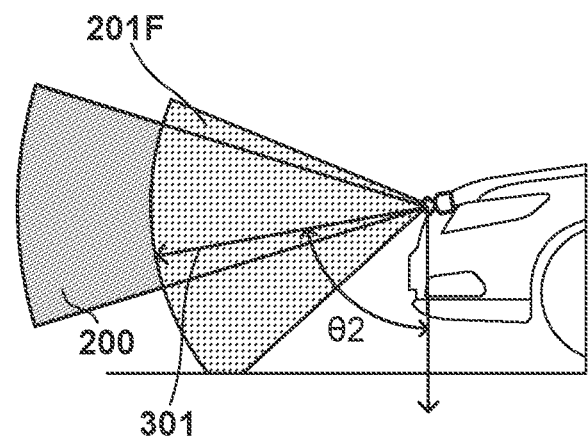
FIGS. 13A to 13C are schematic diagrams illustrating a position in the vertical direction of a region in accordance with a specific rule according to the embodiment.
Figure 13B:
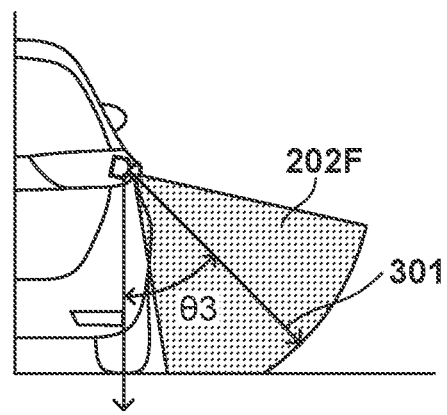
Figure 13C:
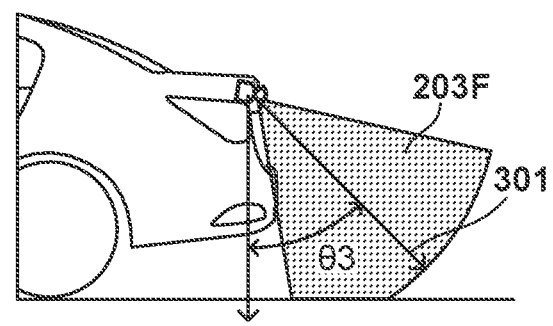

FIGS. 13A to 13C illustrate positions in the vertical direction of the analysis target regions. FIG. 13A illustrates the position in the vertical direction of the region 201F by the fisheye camera 41. FIG. 13B illustrates the position in the vertical direction of the region 202F by the fisheye camera 42. FIG. 13C illustrates the position in the vertical direction of the region 203F by the fisheye camera 43. The position in the vertical direction of each region by the fisheye camera 44 may be similar to that in FIG. 13B, and thus the description thereof will be omitted.

In the region determination rule, as illustrated in FIG. 13A, an angle formed by the transform center 301 defining the region 201F and the vertically downward direction of the vehicle 1 is defined as θ2. θ2 is a value smaller than θ1 in FIGS. 9A to 9C, and may be, for example, 70 degrees. Also in the regions 201R and 201L, the angle formed by the transform center 301 and the vertically downward direction of the vehicle 1 may be defined as θ2. Also in the regions of the fisheye cameras 42 to 44, the angle formed by the transform center 301 and the vertically downward direction of the vehicle 1 is defined as θ3. θ3 is a value smaller than θ2, and may be, for example, 45 degrees.

As described above, in any of the regions in the direction directly ahead of the vehicle 1, in the direction right-diagonally ahead of the vehicle 1, in the direction directly right of the vehicle 1, in the direction right-diagonally behind of the vehicle 1, in the direction directly behind of the vehicle 1, in the direction left-diagonally behind of the vehicle 1, in the direction directly left of the vehicle 1, and in the direction left-diagonally ahead of the vehicle 1, the position in the vertical direction of the analysis target region when the vehicle 1 travels on a narrow road is on a lower side (for example, the transform center 301 is downward) than that when the vehicle 1 travels on a path other than the narrow road (for example, in the case of the normal scene described above). When the vehicle 1 travels on a narrow road, there is a possibility that a wheel of the vehicle 1 runs on a curbstone or falls into a side groove. The analysis accuracy of the situation near the ground is improved by positioning the analysis target region on the lower side. In addition, in the region determination rule when the vehicle 1 travels on a narrow road, the region 201F in the direction directly ahead of the vehicle 1 by the fisheye camera 41 is an analysis target. Thus, as illustrated in FIG. 13A, it is possible to analyze the vicinity in the direction directly ahead of the vehicle 1 that is not included in the field of view 200 of the standard camera 40. In addition, the situation in the direction right-diagonally ahead of the vehicle 1 is analyzed based on the region 202L by the fisheye camera 42. Thus, it is possible to analyze a region near the front wheel of the vehicle 1. The same applies to the situation in the direction left-diagonally ahead of the vehicle 1.

When the vehicle 1 travels on a narrow road, it is less necessary to analyze the direction left-diagonally and right-diagonally ahead of the vehicle for a far distance because an obstacle is near, but it is better to analyze the direction ahead of the vehicle 1 (including the direction right-diagonally ahead of the vehicle 1 and in the direction left-diagonally ahead of the vehicle 1) up to a certain distance. Therefore, in the above example, the position in the vertical direction of the region including the direction right-diagonally ahead of the vehicle 1 and the direction left-diagonally ahead of the vehicle 1 is set to a higher side than the position in the vertical direction of the region including the direction directly right of the vehicle 1 and the direction directly left of the vehicle 1 (that is, θ2>θ3).

In any of the above examples, the region determination rule defines that the direction right-diagonally ahead of the vehicle 1 and the direction left-diagonally ahead of the vehicle 1 are set as targets of the distortion reduction processing more frequently than the direction directly right of the vehicle 1, the direction directly left of the vehicle 1, the direction right-diagonally behind of the vehicle 1, the direction left-diagonally behind of the vehicle 1, and the direction directly behind of the vehicle 1. In the scene where the vehicle 1 travels on a narrow road, there is a high possibility that the vehicle 1 comes into contact with objects in the direction left-diagonally ahead of the vehicle 1 or in the direction right-diagonally ahead of the vehicle 1. Accordingly, by setting the direction left-diagonally ahead of the vehicle 1 and the direction right-diagonally ahead of the vehicle 1 as analysis targets with high frequency, it is possible to execute appropriate analysis according to the traveling scene while reducing the processing load of the control device 2.

In some embodiments, the control device 2 may determine whether image-capturing by the plurality of fisheye cameras 44 is normally performed based on images acquired at the same operation timing in the same direction of the vehicle 1. For example, in a normal traveling scene, the situation in the direction left-diagonally ahead of the vehicle 1 is included in both the region 201L by the fisheye camera 41 and the region 204R by the fisheye camera 44 at the same operation timing every three cycles. The control device 2 may determine whether image-capturing by the fisheye camera 41 and image-capturing by the fisheye camera 44 are normally performed by comparing an image of the region 201L and the image of the region 204R with each other. In a case where the image of the region 201L and the image of the region 204R do not match (for example, in a case where some object is included in only one image), the control device 2 may determine that at least one of the image-capturing by the fisheye camera 41 and the image-capturing by the fisheye camera 44 is not normally performed.

It may not be possible to specify which of the image-capturing by the fisheye camera 41 and the image-capturing by the fisheye camera 44 is not normally performed only by comparing the image of the region 201L with the image of the region 204R. For example, even in a case where the fisheye camera 41 is not operating normally and a specific object (for example, a pedestrian) cannot be captured, the fisheye camera 44 operating normally can capture this object. In this case, the fisheye camera 44 that has captured the object is operating normally. On the other hand, in a case where dirt adheres to the lens of the fisheye camera 41, the fisheye camera 44 does not capture an image of the dirt. In this case, the fisheye camera 44 that cannot capture an object is operating normally. The control device 2 may determine which fisheye camera is not normally capturing an image by analyzing an object included in only one of the fisheye cameras 41 and 44.

The control device 2 may determine which fisheye camera is not normally capturing an image by comparing two images in a plurality of directions of the vehicle. For example, as described above, the control device 2 may determine that at least one of image-capturing by the fisheye camera 41 and the image-capturing by the fisheye camera 44 is not normally performed by comparing the region 201L by the fisheye camera 41 and the region 204R by the fisheye camera 44. Furthermore, the control device 2 compares the region 201R by the fisheye camera 41 and the region 202L by the fisheye camera 42, each of which includes a situation in the direction right-diagonally ahead of the vehicle 1, to determine whether at least one of the image-capturing by the fisheye camera 41 and the image-capturing by the fisheye camera 42 is not normally performed. If both the image-capturing by the fisheye camera 41 and the image-capturing by the fisheye camera 42 are normal as a result of the determination, the control device 2 can determine that the image-capturing by the fisheye camera 44 is not normally performed. In the above example, the direction left-diagonally ahead of the vehicle 1 and the direction right-diagonally ahead of the vehicle 1 are used, but the control device 2 may use another direction diagonally ahead or behind of the vehicle 1.

Summary of Embodiment

Item 1

A control device (2) for a mobile object (1) including a plurality of imaging devices (41-44) including a first imaging device and a second imaging device, the control device comprising:

an image acquisition unit configured to acquire an image (300) of an external environment of the mobile object from the plurality of imaging devices;

a correction unit configured to perform distortion reduction processing for reducing distortion of an image for each of one or more regions (302) included in images acquired from the plurality of imaging devices; and a recognition unit configured to recognize the external environment of the mobile object based on an image (303) on which the distortion reduction processing has been performed, wherein the correction unit is configured to, when a first region that is an imaging region in a specific direction with respect to the mobile object in an image acquired from the first imaging device is set as a target of the distortion reduction processing, set a second region that is an imaging region in the specific direction in an image acquired from the second imaging device as a target of the distortion reduction processing.

According to this item, the external environment of the mobile object can be appropriately recognized.

Item 2

The control device according to Item 1, wherein
the plurality of imaging devices further includes a third imaging device,
the specific direction is a first direction, and
the correction unit is configured to, when a third region that is an imaging region in a second direction different from the first direction in the image acquired from the first imaging device is set as a target of the distortion reduction processing, set a fourth region that is an imaging region in the second direction in an image acquired from the third imaging device as a target of the distortion reduction processing.

According to this item, the two imaging devices can recognize the external environment at the same operation timing in each of the two directions.

Item 3

The control device according to Item 1, wherein
the plurality of imaging devices further includes a third imaging device and a fourth imaging device,
the specific direction is a first direction, and
the correction unit is configured to, when a third region that is an imaging region in a second direction different from the first direction in the image acquired from the first imaging device is set as a target of the distortion reduction processing, set a fourth region that is an imaging region in the second direction in an image acquired from the third imaging device as a target of the distortion reduction processing, and set a fifth region that is an imaging region in a third direction different from the first direction and the second direction in the image acquired from the second imaging device and a sixth region that is an imaging region in the third direction in an image acquired from the fourth imaging device as targets of the distortion reduction processing.

According to this item, each of the two directions can be recognized using the two imaging devices at one operation timing.

Item 4

The control device according to Item 3, wherein the second direction and the third direction are opposite to each other with respect to the mobile object.

According to this item, blind spots of the imaging devices can be complemented with each other.

Item 5

The control device according to Item 3 or 4, wherein
the first imaging device, the second imaging device, the third imaging device, and the fourth imaging device are divided into two groups at a first operation timing, wherein each of two imaging devices in one group sets a region that is an imaging region in the first direction with respect to the mobile object as a target of the distortion reduction processing, and each of two imaging devices in the other group sets a region that is an imaging region in a fourth direction with respect to the mobile object as a target of the distortion reduction processing, and
are divided into two groups at a second operation timing, wherein the two groups at the second operation timing is different from the two groups at the first operation timing, and wherein each of two imaging devices in one group sets a region that is an imaging region in the second direction with respect to the mobile object as a target of the distortion reduction processing, and each of two imaging devices in the other group sets a region that is an imaging region in the third direction with respect to the mobile object as a target of the distortion reduction processing.

According to this item, it is possible to efficiently analyze four directions by using four imaging devices.

Item 6

The control device according to any of Items 2-5, wherein
the first imaging device captures in a direction directly ahead of the mobile object, in a direction right-diagonally ahead of the mobile object, and in a direction left-diagonally ahead of the mobile object,
the second imaging device captures in a direction directly right of the mobile object, in the direction right-diagonally ahead of the mobile object, and in a direction right-diagonally behind of the mobile object, and
the third imaging device captures in a direction directly left of the mobile object, in the direction left-diagonally ahead of the mobile object, and in a direction left-diagonally behind of the mobile object.

According to this item, the external environment can be recognized for various directions of the mobile object.

Item 7

The control device according to any of Items 1-6, wherein the correction unit is configured to, only in a case where the mobile object is in a predetermined moving scene, when a first region that is an imaging region in the specific direction with respect to the mobile object in the image acquired from the first imaging device is set as a target of the distortion reduction processing, set a second region that is an imaging region in the specific direction in the image acquired from the second imaging device as a target of the distortion reduction processing.

According to this item, the same direction can be recognized using the plurality of imaging devices at the same operation timing only when necessary.

Item 8

The control device according to any of Items 1-7, further comprising a determination unit configured to determine whether image-capturing by the first imaging device and image-capturing by the second imaging device are normally performed by comparing an image of the first region with an image of the second region.

According to this item, the operation state of the imaging device can be determined.

Item 9

The control device according to any of Items 1-8, wherein the specific direction is a diagonal direction with respect to the mobile object.

According to this item, diagonal directions of the mobile object can be intensively analyzed.

Item 10

The control device according to any of Items 1-9, wherein each of the plurality of imaging devices is an imaging device to which a fisheye lens is attached.

According to this item, the field of view of the imaging device can be widened.

Item 11

The control device according to any of Items 1-10, wherein
the mobile object further includes another imaging device (40) that captures an image with less distortion than the plurality of imaging devices,
the image acquisition unit is configured to acquire an image of the external environment of the mobile object from the another imaging device, and
the recognition unit is configured to recognize the external environment of the mobile object further based on the image from the another imaging device.

According to this item, the external environment can be recognized using a plurality of types of imaging devices.

Item 12

The control device according to any of Items 1-11, wherein the mobile object is a vehicle (1).

According to this item, the external environment can be appropriately recognized when the vehicle travels.

Item 13

A vehicle comprising the control device according to any of Items 1-11.

According to this item, the above effect can be obtained in the form of a vehicle.

Item 14

A program for causing a computer to function as each unit of the control device according to any of Items 1-11.

According to this item, the above effect can be obtained in the form of a program.

Item 15

A method for controlling a mobile object (1) including a plurality of imaging devices (41-44) including a first imaging device and a second imaging device, the method comprising:
acquiring an image (300) of an external environment of the mobile object from the plurality of imaging devices;
performing distortion reduction processing for reducing distortion of an image for each of one or more regions (302) included in images acquired from the plurality of imaging devices; and
recognizing the external environment of the mobile object based on an image (303) on which the distortion reduction processing has been performed,
wherein when a first region that is an imaging region in a specific direction with respect to the mobile object in an image acquired from the first imaging device is set as a target of the distortion reduction processing, a second region that is an imaging region in the specific direction in an image acquired from the second imaging device is set as a target of the distortion reduction processing.

According to this item, the external environment of the mobile object can be appropriately recognized.

The invention is not limited to the foregoing embodiments, and various variations/changes are possible within the spirit of the invention.

What is claimed is:

1. A control device for a mobile object including a plurality of imaging devices including a first imaging device, a second imaging device, a third imaging device, and a fourth imaging device, the control device comprising at least one processor circuit and a memory storing instructions, that when executed by the processor circuit, cause the processor circuit to at least:
acquire an image of an external environment of the mobile object from the plurality of imaging devices;
set one or more regions included in images acquired from the plurality of imaging devices as a target of distortion reduction processing for reducing distortion of an image;
perform the distortion reduction processing on each of the one or more regions set as the target of the distortion reduction processing; and
recognize the external environment of the mobile object based on an image on which the distortion reduction processing has been performed,
wherein the one or more regions set as the target of the distortion reduction processing are periodically changed;
wherein the target of the distortion reduction processing at a first operation timing includes a first region that is an imaging region in a first direction with respect to the mobile object in an image acquired from the first imaging device and a second region that is an imaging region in the first direction in an image acquired from the second imaging device,
wherein the target of the distortion reduction processing at a second operation timing different from the first operation timing includes a third region that is an imaging region in a second direction different from the first direction in the image acquired from the first imaging device, a fourth region that is an imaging region in the second direction in an image acquired from the third imaging device, a fifth region that is an imaging region in a third direction different from the first direction and the second direction in the image acquired from the second imaging device, and a sixth region that is an imaging region in the third direction in an image acquired from the fourth imaging device,
the first imaging device, the second imaging device, the third imaging device, and the fourth imaging device are divided into two groups at the first operation timing, wherein each of two imaging devices in one group sets a region that is an imaging region in the first direction with respect to the mobile object as the target of the distortion reduction processing, and each of two imaging devices in the other group sets a region that is an imaging region in a fourth direction with respect to the mobile object as the target of the distortion reduction processing, and
the first imaging device, the second imaging device, the third imaging device, and the fourth imaging device are divided into two groups at the second operation timing, wherein the two groups at the second operation timing is different from the two groups at the first operation timing, and wherein each of two imaging devices in one group sets a region that is an imaging region in the second direction with respect to the mobile object as the target of the distortion reduction processing, and each of two imaging devices in the other group sets a region that is an imaging region in the third direction with respect to the mobile object as the target of the distortion reduction processing.

2. The control device according to claim 1, wherein
the first imaging device captures in a direction directly ahead of the mobile object, in a direction right-diagonally ahead of the mobile object, and in a direction left-diagonally ahead of the mobile object,
the second imaging device captures in a direction directly right of the mobile object, in the direction right-diagonally ahead of the mobile object, and in a direction right-diagonally behind of the mobile object, and
the third imaging device captures in a direction directly left of the mobile object, in the direction left-diagonally ahead of the mobile object, and in a direction left-diagonally behind of the mobile object.

3. The control device according to claim 1, wherein the second direction and the third direction are opposite to each other with respect to the mobile object.

4. The control device according to claim 1, wherein only in a case where the mobile object is in a predetermined moving scene, the target of the distortion reduction processing includes the first region and the second region.

5. The control device according to claim 1, wherein the instructions further cause the processor circuit to determine whether image-capturing by the first imaging device and image-capturing by the second imaging device are normally performed by comparing an image of the first region with an image of the second region.

6. The control device according to claim 1, wherein the first direction is a diagonal direction with respect to the mobile object.

7. The control device according to claim 1, wherein each of the plurality of imaging devices is an imaging device to which a fisheye lens is attached.

8. The control device according to claim 1, wherein
the mobile object further includes another imaging device that captures an image with less distortion than the plurality of imaging devices, and
the instructions further cause the processor circuit to:
acquire an image of the external environment of the mobile object from the another imaging device, and
recognize the external environment of the mobile object further based on the image from the another imaging device.

9. The control device according to claim 1, wherein the mobile object is a vehicle.

10. A vehicle comprising the control device according to claim 1.

11. A non-transitory storage medium comprising a program for causing a computer to function as the control device according to claim 1.

12. The control device according to claim 1, wherein the instructions further cause the processor circuit to move the target of the distortion reduction processing downward when the mobile object travels on a narrow road.

13. A method for controlling a mobile object including a plurality of imaging devices including a first imaging device, a second imaging device, a third imaging device, and a fourth imaging device, the method comprising:
acquiring an image of an external environment of the mobile object from the plurality of imaging devices;
setting one or more regions included in images acquired from the plurality of imaging devices as a target of distortion reduction processing for reducing distortion of an image;
performing the distortion reduction processing on each of the one or more regions set as the target of the distortion reduction processing; and
recognizing the external environment of the mobile object based on an image on which the distortion reduction processing has been performed,
wherein the one or more regions set as the target of the distortion reduction processing are periodically changed;
wherein the target of the distortion reduction processing at a first operation timing includes a first region that is an imaging region in a first direction with respect to the mobile object in an image acquired from the first imaging device and a second region that is an imaging region in the first direction in an image acquired from the second imaging device,
wherein the target of the distortion reduction processing at a second operation timing different from the first operation timing includes a third region that is an imaging region in a second direction different from the first direction in the image acquired from the first imaging device, a fourth region that is an imaging region in the second direction in an image acquired from the third imaging device, a fifth region that is an imaging region in a third direction different from the first direction and the second direction in the image acquired from the second imaging device, and a sixth region that is an imaging region in the third direction in an image acquired from the fourth imaging device,
the first imaging device, the second imaging device, the third imaging device, and the fourth imaging device are divided into two groups at the first operation timing, wherein each of two imaging devices in one group sets a region that is an imaging region in the first direction with respect to the mobile object as the target of the distortion reduction processing, and each of two imaging devices in the other group sets a region that is an imaging region in a fourth direction with respect to the mobile object as the target of the distortion reduction processing, and
the first imaging device, the second imaging device, the third imaging device, and the fourth imaging device are divided into two groups at the second operation timing, wherein the two groups at the second operation timing is different from the two groups at the first operation timing, and wherein each of two imaging devices in one group sets a region that is an imaging region in the second direction with respect to the mobile object as the target of the distortion reduction processing, and each of two imaging devices in the other group sets a region that is an imaging region in the third direction with respect to the mobile object as the target of the distortion reduction processing.

* * * * *